(12) United States Patent
Tetrick (10) Patent No.: US 7,539,812 B2
(45) Date of Patent: May 26, 2009

(54) SYSTEM AND METHOD TO INCREASE DRAM PARALLELISM

(75) Inventor: R. Scott Tetrick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 11/171,804

(22) Filed: Jun. 30, 2005

(65) Prior Publication Data

US 2007/0005877 A1    Jan. 4, 2007

(51) Int. Cl.
*G06F 13/00* (2006.01)
*G06F 13/28* (2006.01)

(52) U.S. Cl. ..................................... 711/105
(58) Field of Classification Search .................. 711/105
See application file for complete search history.

(56) References Cited

U.S. PATENT DOCUMENTS

| | | |
|---|---|---|
| 2002/0144071 A1 | 10/2002 | Williams et al. |
| 2004/0256638 A1* | 12/2004 | Perego et al. ............... 257/200 |
| 2005/0055499 A1 | 3/2005 | Leddige et al. |
| 2006/0179213 A1* | 8/2006 | Brittain et al. .............. 711/105 |
| 2006/0179262 A1* | 8/2006 | Brittain et al. .............. 711/169 |
| 2008/0091906 A1* | 4/2008 | Brittain et al. .............. 711/167 |

FOREIGN PATENT DOCUMENTS

WO    WO 2004/109525 A2    12/2004

OTHER PUBLICATIONS

"PCT International Search Report of the International Searching Authority", mailed Jan. 1, 2007, for PCT/US2006/025540, 3pgs.

* cited by examiner

*Primary Examiner*—Pierre-Michel Bataille
*Assistant Examiner*—Edward J Dudek
(74) *Attorney, Agent, or Firm*—Buckley, Maschoff & Talwalkar LLC (57) ABSTRACT

A method and apparatus for a multi-ranked memory protocol. In some embodiments an apparatus may include a memory controller (MC), and a plurality of ranked dynamic random access memory (DRAM) devices interfaced with the MC, wherein timing and initiation operations between the MC and the plurality of ranked DRAM devices and between the plurality of ranked DRAM devices is controlled by the MC. In some embodiments, a method may include addressing a request to one of a plurality of ranked DRAM devices, sending the request from a MC interfaced with the plurality of ranked DRAM devices, and propagating the request from the MC through the plurality of ranked DRAM devices to the addressed ranked DRAM device MC, wherein the requests includes data associated therewith.

12 Claims, 14 Drawing Sheets

SYSTEM AND METHOD TO INCREASE DRAM PARALLELISM

BACKGROUND OF THE INVENTION

Computer systems use memory devices, such as dynamic random access memory (DRAM) devices, to store data that are accessed by a processor. The memory devices may be used as system memory in a computer system. In some computer systems, the processor communicates with the system memory through a processor bus and a memory controller. The processor may issue a memory request, which includes a memory command, such as a read or write command, and an address designating the location from which data or instructions are to be read or written. The memory controller may use a command from the processor to generate appropriate command signals as well as row and column addresses that are applied to the system memory. In response to the commands and addresses, data are transferred between the system memory and the processor. The memory controller is often part of a system controller, which may also include bus bridge circuitry for coupling the processor bus to an expansion bus.

In general, continued gains in the operating speed for processors exceeds increases gained by memory devices and memory controllers that interface with the memory devices and processors. Thus, in some computer systems, a data bandwidth between the processor and the memory devices may be limited.

Thus, there is a general need for a method and apparatus for an efficient memory management and control protocol, including management and control of DRAM devices.

DETAILED DESCRIPTION

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

Figure 1:
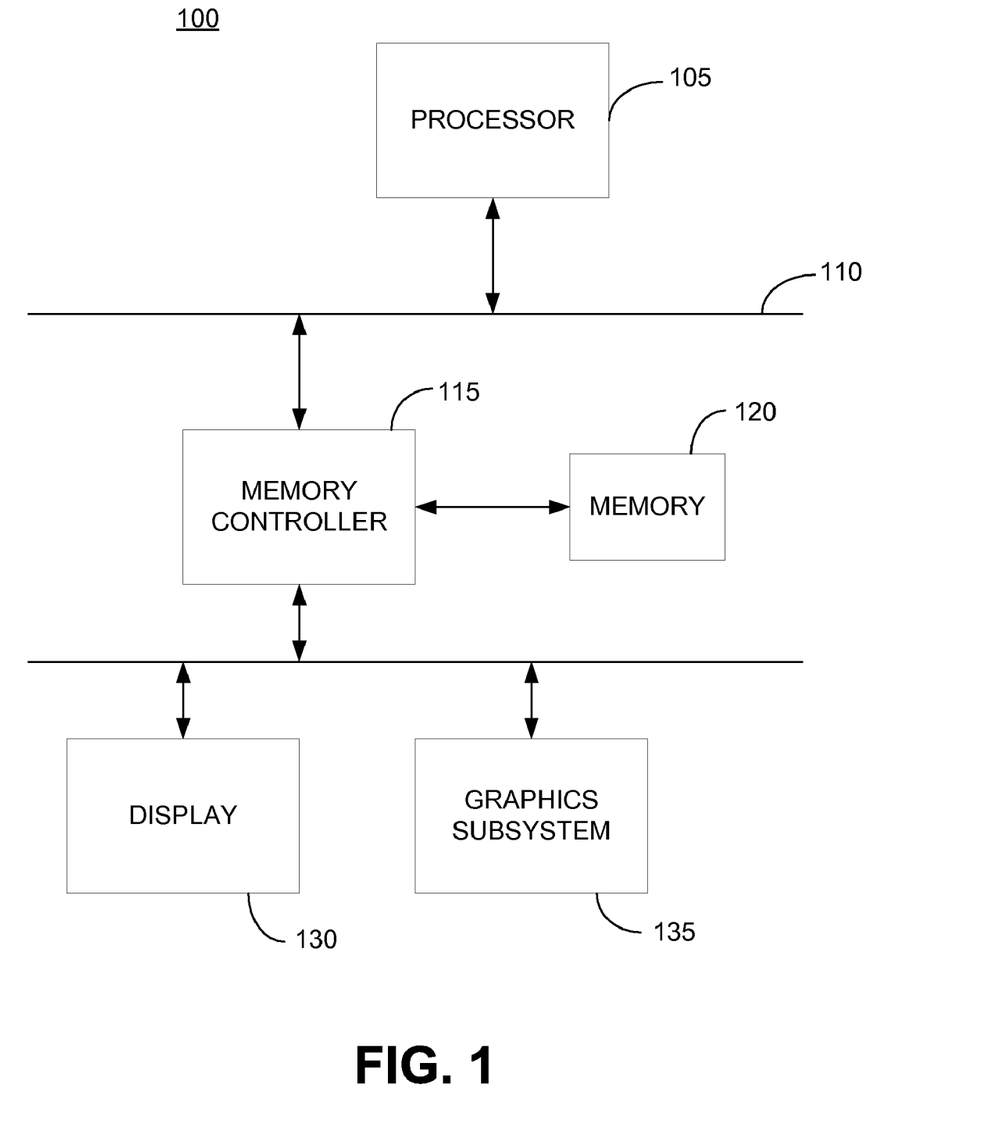
FIG. 1 is an exemplary block diagram of a system, in accordance with some embodiments herein.

FIG. 1 is a block diagram of a computer system 100 that may include an implementation of some embodiments herein. System 100 includes a processor 105 that may process data. Processor 105 may implement a number of instructions sets and include one or more core processors. Processor 105 is connected to a CPU bus 110 that provides a link between processor 105 and other components and devices of system 100.

For example, a memory controller (MC) is connected to bus 110. MC 115 may direct or control data traffic and operations between memory 120 and processor 105 and other components such as, for example, a display 130 and a graphics susbsystem 135. Graphics subsystem 135 may process and render graphics and display 130 may display graphics rendered by graphics subsystem 135. Memory 120 may be a random access memory (RAM) device, a double data rate memory device, a dynamic random access memory (DRAM) device. In some embodiments herein, memory 120 may comprise a number of DRAM devices connected together according to a multi-rank protocol. The DRAM devices linked together by the multi-rank protocol may be collectively referred to herein as a multi-rank DRAM device.

It should be understood that system 100 may include, in some embodiments, additional, fewer, and alternative components and devices to those depicted in FIG. 1, in accordance with some embodiments herein.

Figure 2:
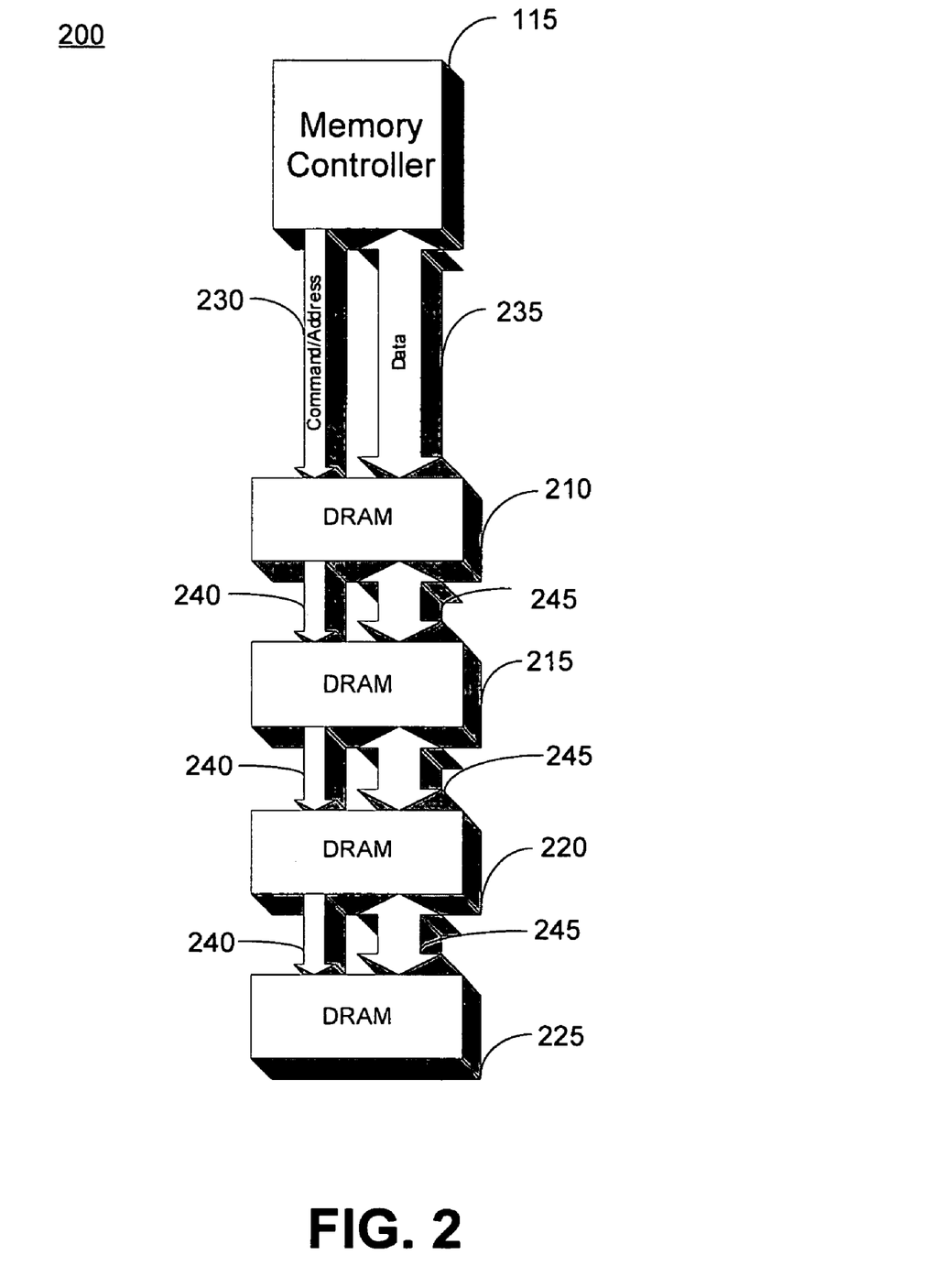
FIG. 2 is an exemplary apparatus, in accordance with some embodiments herein.

FIG. 2 is an exemplary illustration, 200, of MC 115 and memory 120 of FIG. 1. Memory 120, in some embodiments, may include a plurality of DRAM devices 210, 215, 220, 225. DRAM connections between, for example, DRAM 210 and MC 115, as well as those connections between DRAMs (e.g., 210, 215, 220, and 225) adhere to a multi-rank protocol. According to some embodiments herein, the multi-rank protocol assigns a rank to each of the plurality of DRAMs. The rank assigned to a DRAM may be based on, at least, a distance the DRAM is located from MC 115.

Referring to FIG. 2, memory 120 includes DRAM 210 (rank 0), DRAM 215 (rank 1), DRAM 220 (rank 2), and DRAM 225 (rank 3). There is a measurable delay associated with each ranked DRAM. The measurable delay associated with each ranked DRAM may result from a propagation delay due to the electrical connection between MC 115 and DRAM 210 and a propagation delay internal to each ranked DRAM (i.e., a flow through delay). Herein, the delay attributable to an electrical connection between the ranked DRAMs is assumed to be zero based on the short electrical connections therebetween.

In some embodiments herein, all timing for operations between MC 115 and ranked DRAMs 210-225 is controlled by MC 115. Also, an initiation of all such operations is accomplished by MC 115. Further, communication between MC 115 and DRAM 210 (rank 0) and communication between the plurality of ranked DRAMs 210-225 may occur over a unidirectional link or over a bidirectional link. For example, link 230 to route a request between MC 115 and DRAM 210 may be unidirectional or bidirectional. Also, links 240 and 245 provided between two adjacent DRAMs (e.g., 210 and 215; 215 and 220; 220 and 225) may be unidirectional or bidirectional.

Bidirectional links of some embodiments herein have a turnaround time (i.e., delay) due to a change of direction on the link. The turnaround time may be used both internally by a DRAM device and externally on the link to avoid contention of request and data signals. Bidirectional links may be driven by MC 115 and DRAM devices 210-225. However, only one of MC 115 and DRAM devices 210-225 may drive the bidirectional link at any given time.

Unidirectional links of some embodiments herein may have separate signal links for an input and an output. Regarding unidirectional links, traffic in opposing directions may be driven simultaneously since opposing traffic is on separate links. Also, unidirectional links do not have a turnaround delay associated therewith since traffic on the unidirectional link is constrained to a single direction.

In some embodiments, a request and associated data may be routed between MC 115 and DRAM devices 120 on separate pins or links. As illustrated in FIG. 2, a request or command is provided on link 230 from MC 115 to DRAM device 210. Again, MC 115 initiates all operations. The command is propagated through the ranked DRAM devices 120, as needed. Command links 230 and 240 are unidirectional. Data link 235 between MC 115 and DRAM device 210 and data links 245 between adjacent DRAM devices are bidirectional and may be driven to or away from MC 115. Commands may propagate with the delays mentioned above.

A variety of requests may be initiated by a MC herein to facilitate an operations or processes to access the multi-ranked DRAM devices of some embodiments. Two requests, namely a READ command and a WRITE command, have data associated therewith and thus use a data link. In some embodiments herein, a command may comprise information in addition to, for example, the READ or WRITE command. Such additional information may include an address rank for the ranked DRAM addressed by the command and a column address of the DRAM.

In an instance the MC initiates a READ command, the READ command may be implemented using a multi-ranked apparatus and method, in accordance herewith. The READ command may be accomplished using a variable read latency process. According to the variable read latency process, each ranked DRAM is assigned different read latency time. The read latency time for each ranked DRAM is different and based on the propagation delays associated with each DRAM and varies depending on the distance the DRAM device is located from the MC. Thus, the latency for reading a rank from the MC is rank-dependent.

Figure 3:
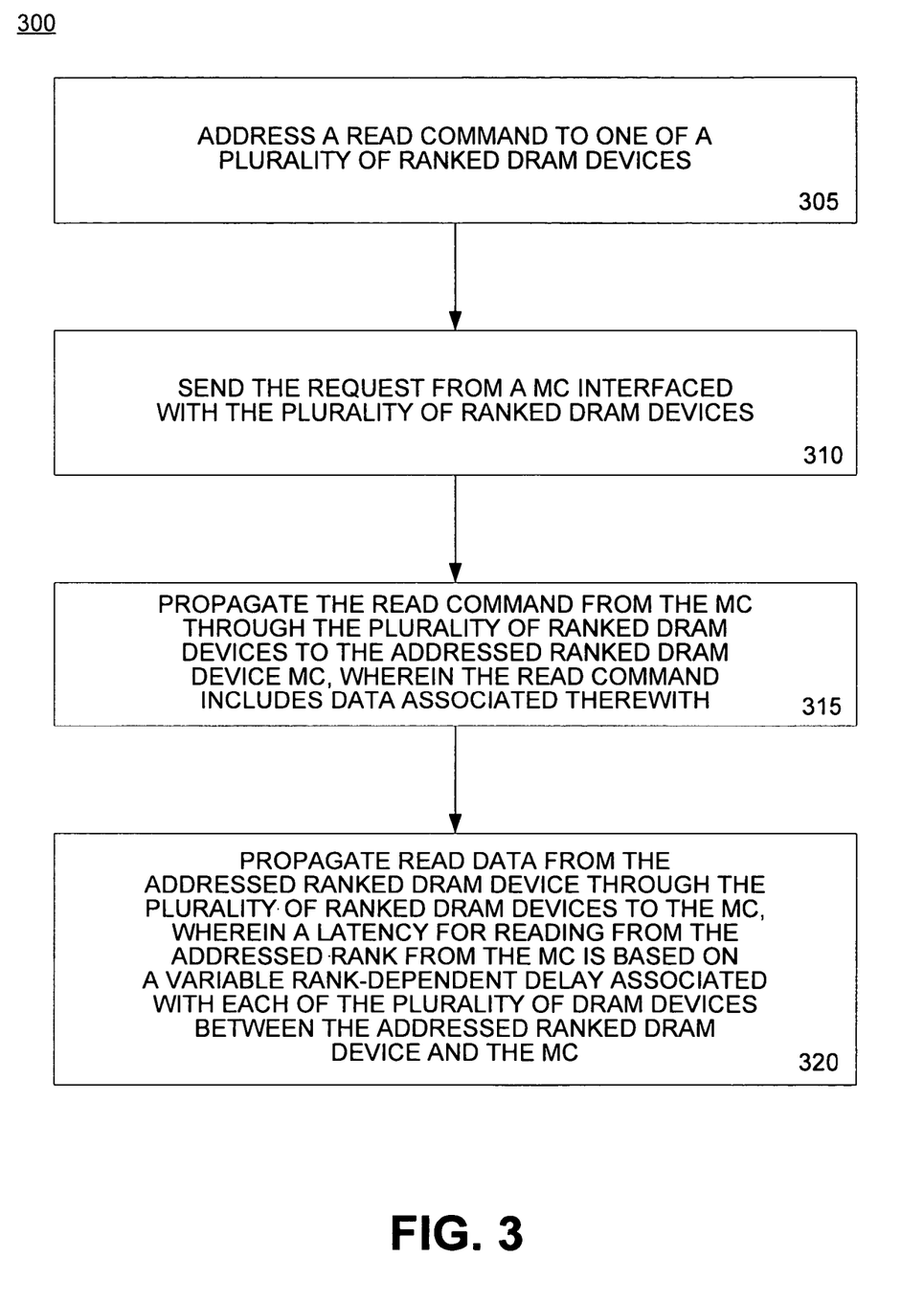
FIG. 3 is an exemplary flow diagram, according to some embodiments herein.

FIG. 3 is an exemplary flow diagram of a process 300, in some embodiments herein. At operation 305, a MC initiates and addresses a READ command to one of a number of ranked DRAM devices interfaced with the memory controller. The MC controls all timing and initiation of operations between the MC and the plurality of ranked DRAM devices and between the plurality of ranked DRAM devices. The initiated READ command includes an address of one of the ranked DRAM devices from which data is to be read. At operation 310, the READ command is sent from the MC to the plurality of ranked DRAM devices interfaced with the MC. The READ command is propagated from the MC through the plurality of ranked DRAM devices to the DRAM device addressed by the READ command at operation 315.

At operation 320, read data from the addressed ranked DRAM device is propagated through the plurality of ranked DRAM devices between it and the MC to the MC. The latency associated with reading the requested data from the addressed ranked DRAM device is variable and based on a rank dependent delay associated each of the plurality of ranked DRAM devices traversed in the READ operation.

Figure 4:
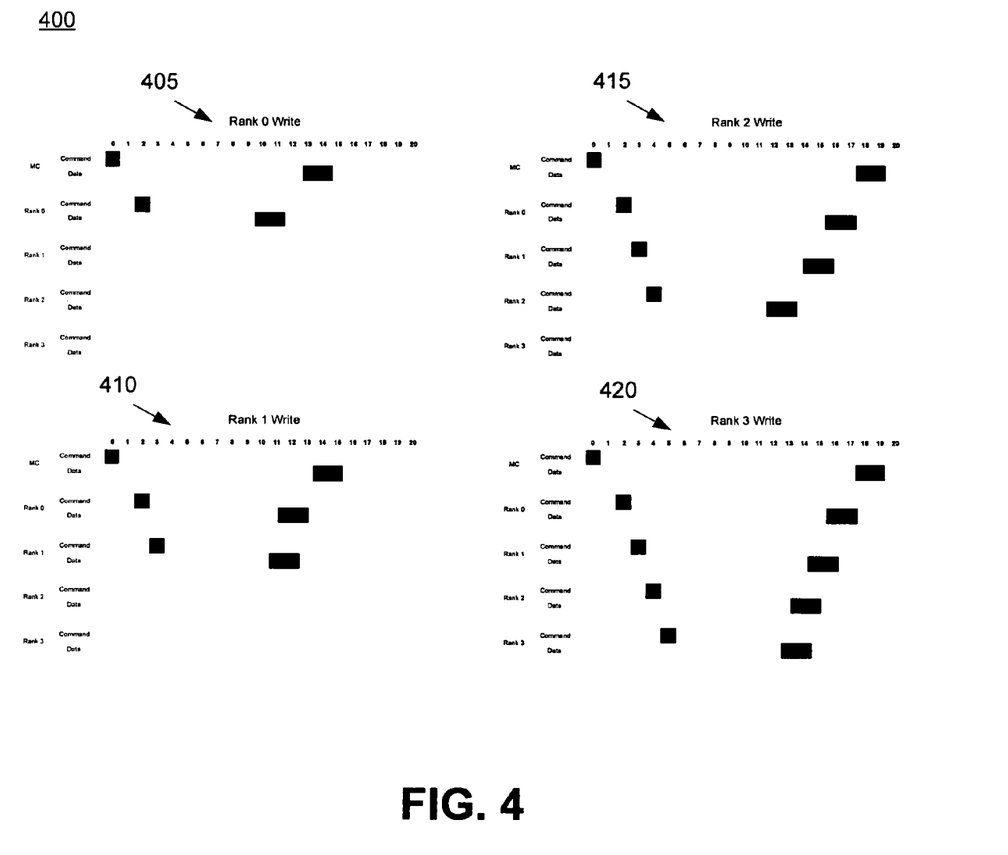
FIG. 4 is an exemplary timing diagram, in accordance with some embodiments herein.

FIG. 4 is an exemplary timing diagram for a READ operation, in some embodiments herein. Timing diagram 400 illustrates READ command timing through a multi-ranked DRAM apparatus comprising a total of four (4) ranked DRAM devices such as, for example, DRAM devices 210, 215, 220, and 225. The DRAM devices are ranked 0 to 4 as follows: DRAM device 210 is ranked 0, DRAM device 215 is ranked 1, DRAM device 220 is ranked 2, and DRAM device 225 is ranked 4.

As illustrated in timing chart 405, a READ command issued by the MC to rank 0 propagates from the MC to the 0 ranked DRAM device where the requested data is read, and propagates back to the MC. The latency time associated with this READ operation is 12 units. For a READ command to the rank 3 DRAM device, the command propagates from the MC through ranks 0, 1, and 2 to the rank 3 DRAM device where the requested data is read, and propagates back to the MC. The latency time associated with this READ operation from the MC point of view is 18 units. Timing diagrams 405-420 demonstrate the timing required for a READ command addressed to ranks 0-4, respectively. The MC is responsible for scheduling (i.e., timing) for the entire return path for the. READ operation from the addressed ranked DRAM device to the MC, when the requested data is available. In an event the entire path cannot be allocated to the READ operation, the READ command must be delayed until the path can be allocated.

Figure 5:
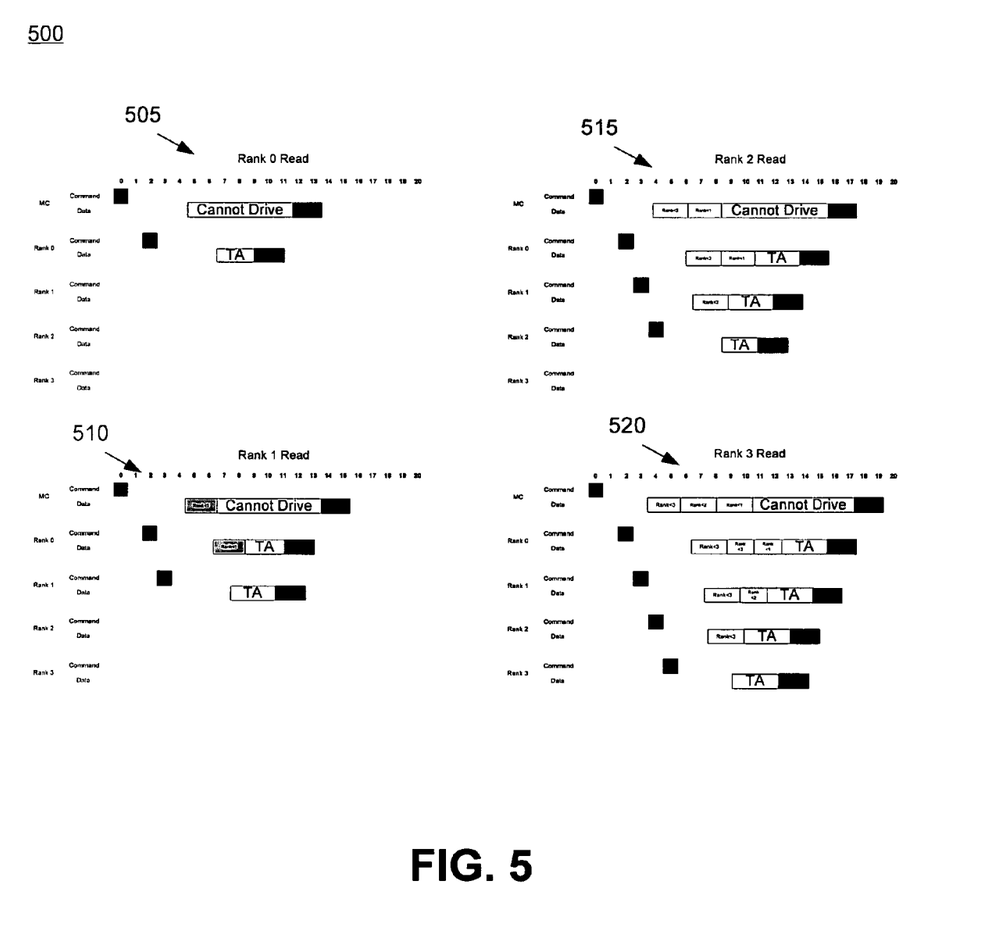
FIG. 5 is an exemplary timing diagram, in accordance with some embodiments herein.

FIG. 5 provides exemplary timing diagram 500 for a READ operation, in accordance with some embodiments herein. FIGS. 505-520 provide timing diagrams that demonstrate an impact of allocating an entire data path to a READ command for a READ command addressed to ranks 0-4, respectively. Turnaround (TA) times have been added to the timing diagrams and extrapolated for the timing delays. Allocation of the channel for the READ command renders the channel unavailable (i.e., cannot drive) for WRITE commands on bidirectional links. It is seen that the farther the addressed ranked DRAM device is from the MC, the constraints on the availability of the channel increases.

Figure 6:
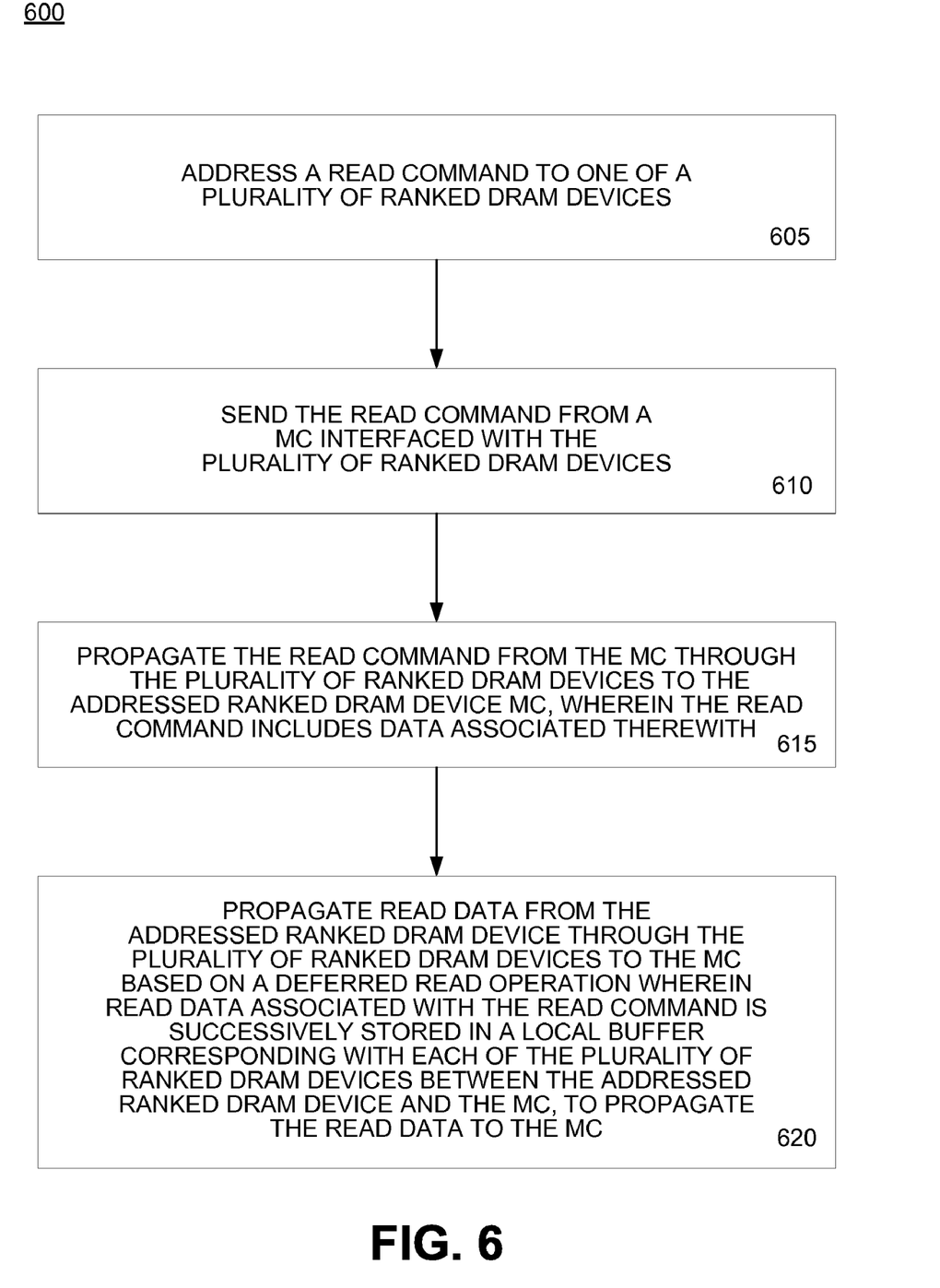
FIG. 6 is an exemplary flow diagram, in accordance with some embodiments herein.

FIG. 6 is an exemplary flow diagram for some embodiments of a method herein. Process 600 may be better understood by referring to timing diagrams 700 in FIG. 7. Process 600 is directed to a read deferred process. The allocation of an entire communication link may be difficult to implement given the many requests made in a computer system. Read deferred process 600 addresses this difficulty by attempting to divide a READ operation into portions that may be managed over the links between the MC and the plurality of ranked DRAM devices efficiently.

Read deferred process 600 may use command bits in the implementation thereof, in addition to the READ command and data bits. The additional command bits may represent an ENABLE READ BUFFER command for a local buffer storage device associated with each of the plurality of ranked DRAM devices. The ENABLE READ BUFFER command bits provide a mechanism for the MC to manage the DRAM buffer, the local storage held inside of each ranked DRAM device. An asserted ENABLE READ BUFFER command allows a link to be driven by a rank(n+1) DRAM device to a rank(n) DRAM device. An asserted ENABLE READ BUFFER command, as controlled by the MC, may allocate, for example, a rank 2 DRAM device (e.g., DRAM device 220) to drive data to a rank 1 DRAM device (e.g., DRAM device 215) in the process of propagating requested read data to the MC. For the 4 rank system illustrated herein, 4 ENABLE READ BUFFER bits may be used.

For a READ command addressed to rank 0, the deferred read process shown in the timing diagram of FIG. 705 reduces to a process similar to that depicted in variable latency read process 300 and FIGS. 4 and 5.

At operation 605, the MC initiates a READ command to one of a number of ranked DRAM devices interfaced with the MC. The MC controls all timing and initiation of operations between the MC and the plurality of ranked DRAM devices and between the plurality of ranked DRAM devices. The initiated READ command includes the address of the ranked DRAM devices from which data is to be read.

At operation 610, the READ command is sent from the MC to the plurality of ranked DRAM devices interfaced with the MC. The READ command is propagated from the MC through the plurality of ranked DRAM devices to the DRAM device addressed by the READ command at operation 615.

At operation 620, read data from the addressed ranked DRAM device is propagated through the plurality of ranked DRAM devices between it and the MC to the MC. When the READ command is issued to, for example, rank 2, the MC allocates only the data path between rank(N=2) and rank(N−1=2−1=1) for the READ command. The received read data at rank 1 is stored in a local buffer associated with the rank 1 DRAM device until an ENABLE READ BUFFER command is asserter for rank 1. When the rank 1 DRAM device's corresponding ENABLE READ BUFFER is asserted by the MC, the read data in the local buffer of the rank 1 DRAM device is driven to rank(N−1=1−1=0), and so on until the MC is reached.

Figure 7:
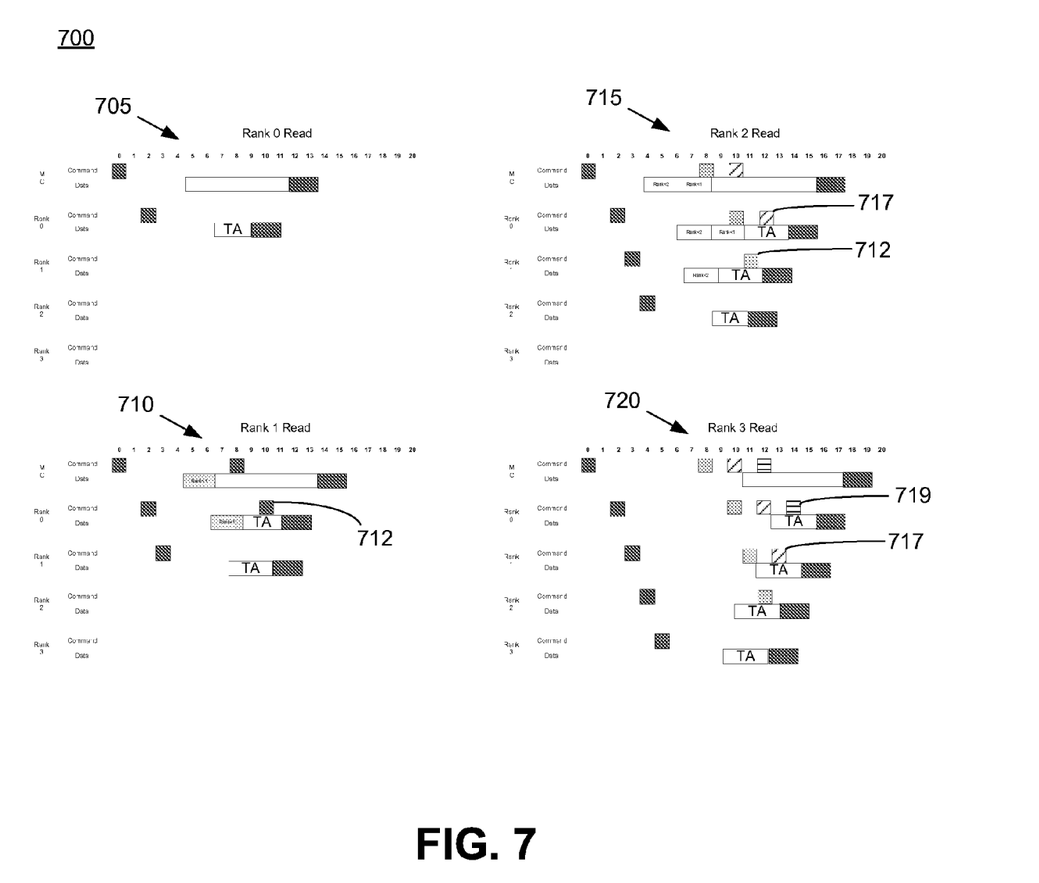
FIG. 7 is an exemplary timing diagram, in accordance with some embodiments herein.

As depicted, the write limitations associated with the variable latency read process 300 are eliminated and the turn-around delays are simplified. It is noted that process 600 does include the costs of additional information, the ENABLE READ BUFFER bits, to move the requested read data from buffer to buffer of corresponding ranked DRAM devices until the MC is reached. ENABLE READ BUFFER bits 712, 717, and 719 are shown in the timing diagrams 710, 715, and 720 to illustrate the additional bits used in process 600.

In some embodiments, multiple outstanding READ operations may be supported using multiple storage elements for each DRAM device. The multiple outstanding READs may be handled in a first in, first out (FIFO) manner. For example, when a rank receives an ENABLE READ BUFFER assertions, it moves its associated first data buffer on the data signals and shifts the remainder of data up. In an instance a rank does not have any stored data, an ENABLE READ BUFFER assertion is not defined.

Figure 8:
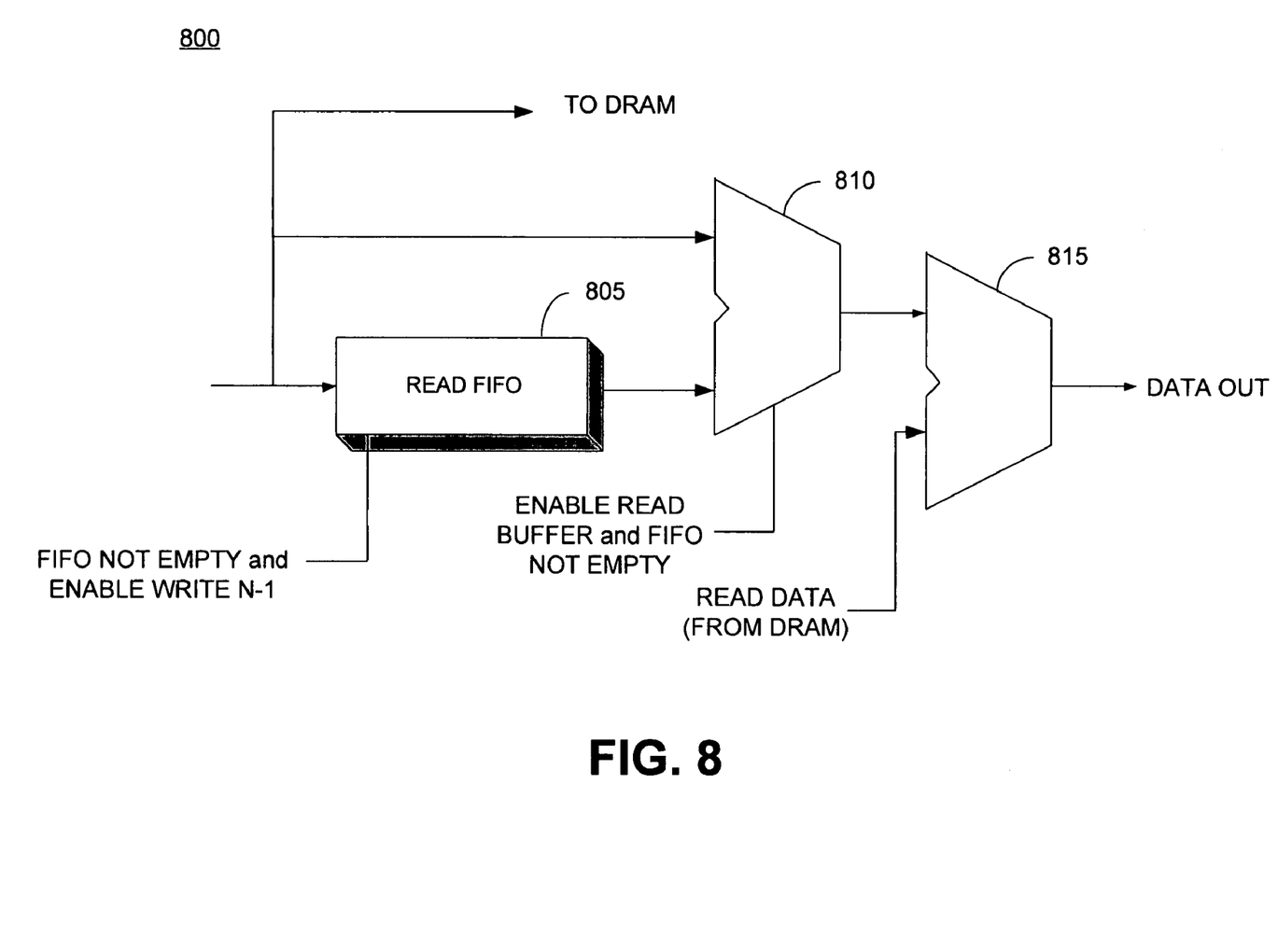
FIG. 8 is a schematic diagram; in accordance with some embodiments herein.

FIG. 8 is an exemplary schematic diagram of a circuit that may be used to implement some embodiments of a DRAM device including local buffers, in accordance with some embodiments herein. Circuit 800 includes a READ FIFO buffer 805 and two data multiplexers 810, 815. Circuit 800 includes a bypass option that bypasses referencing READ FIFO 805. The bypass option is depicted by the multiplexer 815 input that reads data directly from the DRAM. If READ FIFO 805 is empty, the ENABLE READ BUFFER is asserted and data arrives from the next rank at the same time. Further understanding of an operation of circuit 800 may be had by referring to table 1 below.

TABLE 1

| Memory Controller Operation | FIFO CONTENTS | | | |
|---|---|---|---|---|
| | RANK 0 | RANK 1 | RANK 2 | RANK 3 |
| R0 - READ RANK 3 | | | | Read Data 0 |
| R1 - READ RANK 2 | Read Data 2 | Read Data 1 | | Read Data 0 |
| R2 - READ RANK 1 | Read Data 2 | Read Data 1 | | Read Data 0 |
| R3 - READ RANK 2 | Read Data | Read | | Read Data 0 |

TABLE 1-continued

| Memory Controller Operation | FIFO CONTENTS | | | |
|---|---|---|---|---|
| | RANK 0 | RANK 1 | RANK 2 | RANK 3 |
| ENABLE READ BUFFER RANK 1 | Read Data 2 | 2 Read Data 3 Read Data 1 | Data 3 | Read Data 0 |
| ENABLE READ BUFFER RANK 0 (R2 Completes) | Read Data 1 | Read Data 2 | | Read Data 0 |
| ENABLE READ BUFFER RANKS 0, 1 and 2 (R1 Completes) | Read Data 2 | Read Data 0 | | |
| ENABLE READ BUFFER RANKS 0, 1 (R2 Completes) | Read Data 0 | | | |
| ENABLE READ BUFFER RANKS 0 (R0 Completes) | | | | |

Figure 9:
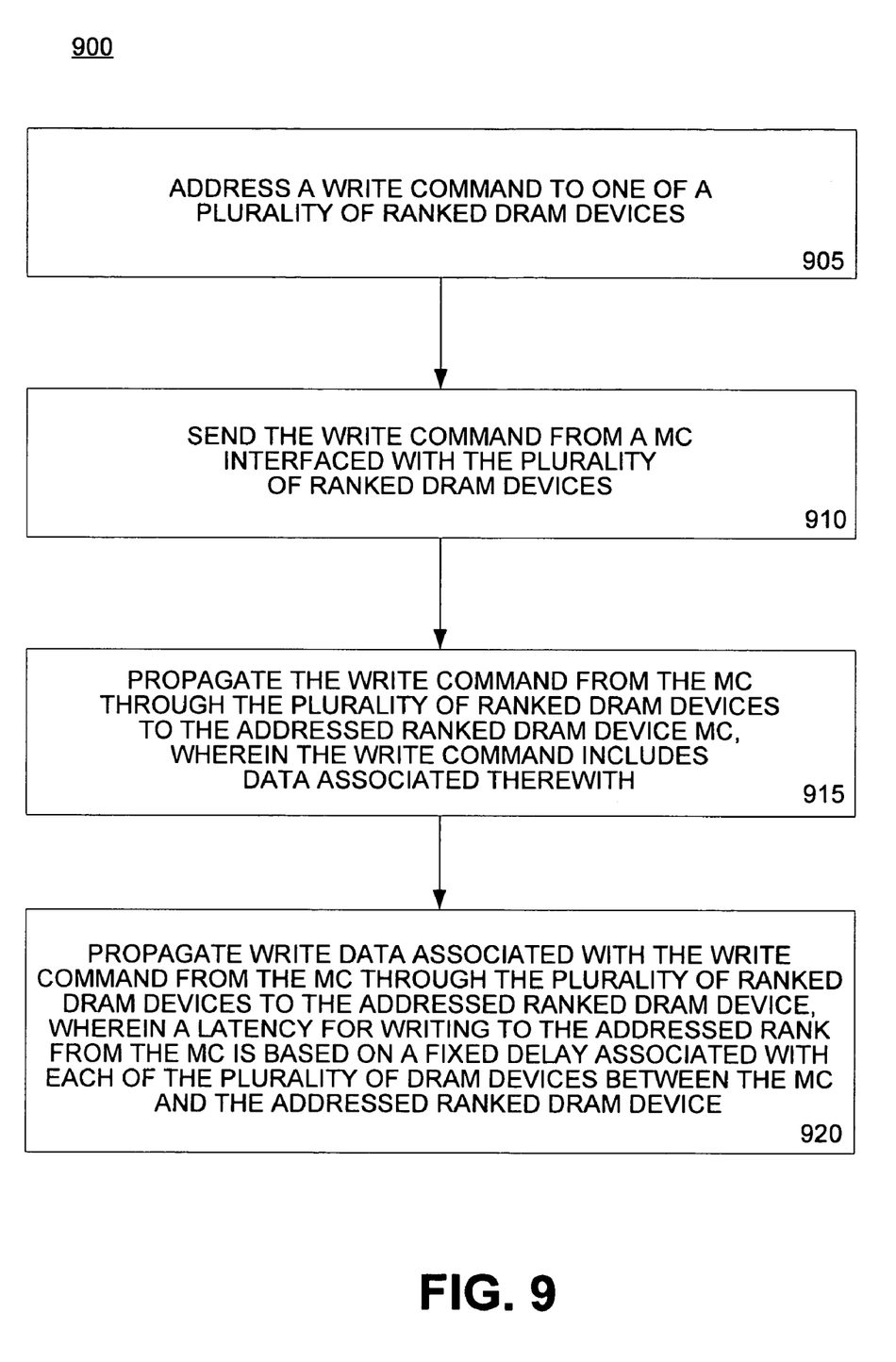
FIG. 9 is an exemplary flow diagram, in accordance with some embodiments herein.

FIG. 9 is a flow diagram for an exemplary process 900, in accordance with some embodiments herein. Process 900 may be better understood by referring to timing diagrams 1000 in FIG. 10. Process 900 is directed to a pass through write process. The data signals are allocated for the WRT|ITE command from the MC to the addressed ranked DRAM device. For example, a WRITE command addressed to rank 3 DRAM device will reserve the data signals of all intervening ranks (i.e., ranks 0, 1, and 2), as illustrated in timing diagrams 1005, 1010, 1015, and 1020.

At operation 905, the MC initiates a WRITE command to one of a number of ranked DRAM devices interfaced with the MC. The MC controls all timing and initiation of operations between the MC and the plurality of ranked DRAM devices and between the plurality of ranked DRAM devices. The initiated WRITE command includes an address of one of the ranked DRAM devices to which data is to be written.

At operation 910, the WRITE command is sent from the MC to the plurality of ranked DRAM devices interfaced with the MC. The WRITE command is propagated from the MC through the plurality of ranked DRAM devices to the DRAM device addressed by the WRITE command at operation 915. The data associated with a WRITE command may be delayed a fixed number of units. The MC manages the data path through the propagation of the plurality of ranked DRAM devices.

At operation 920, WRITE data for the addressed ranked DRAM device is propagated from the MC through the plurality of ranked DRAM devices to the addressed DRAM device. The latency associated with writing the requested data to the addressed ranked DRAM device is based on a fixed delay that is uniform for the plurality of ranked DRAM devices traversed in the WRITE operation.

Figure 11:
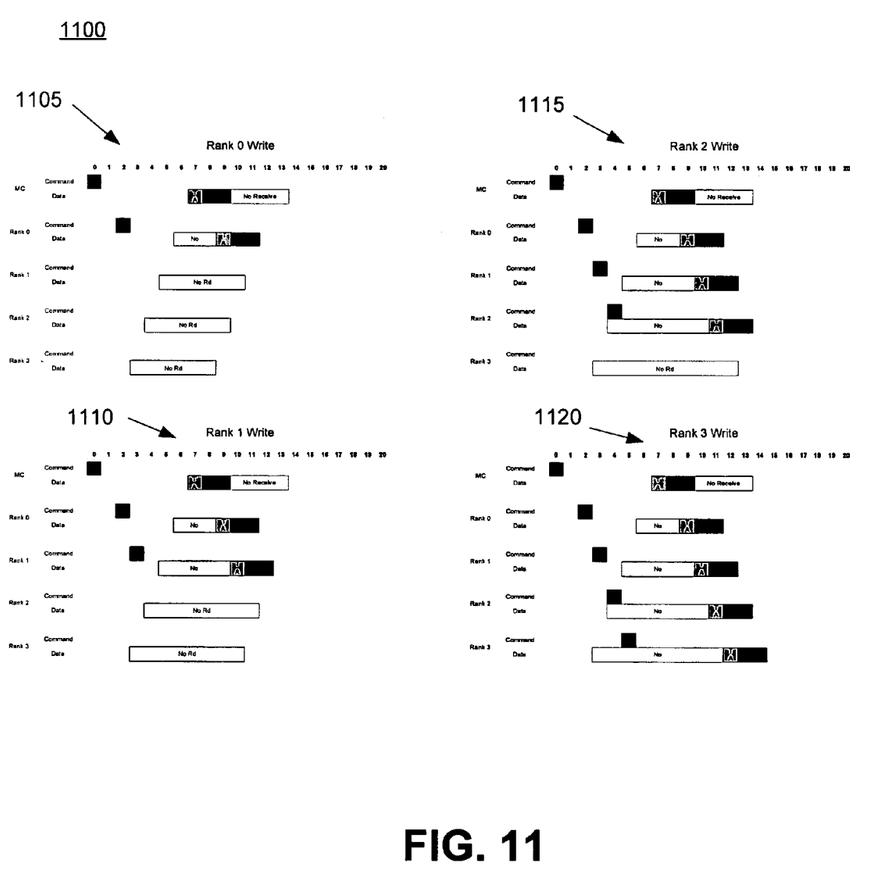
FIG. 11 is an exemplary timing diagram, in accordance with some embodiments herein.

WRITES on a data link preclude READS from completing at previous times. FIG. 11 is an illustration of the impact of allocating an entire link for a WRITE command operation. As shown in timing diagrams 1105, 1110, 1115, and 1120, there is a fixed delay between a WRITE command and the write data. Also depicted are time delays incurred for a turnaround (TA) and periods of time required to complete the WRITE command (No Receive), at the expense of other commands.

Figure 12:
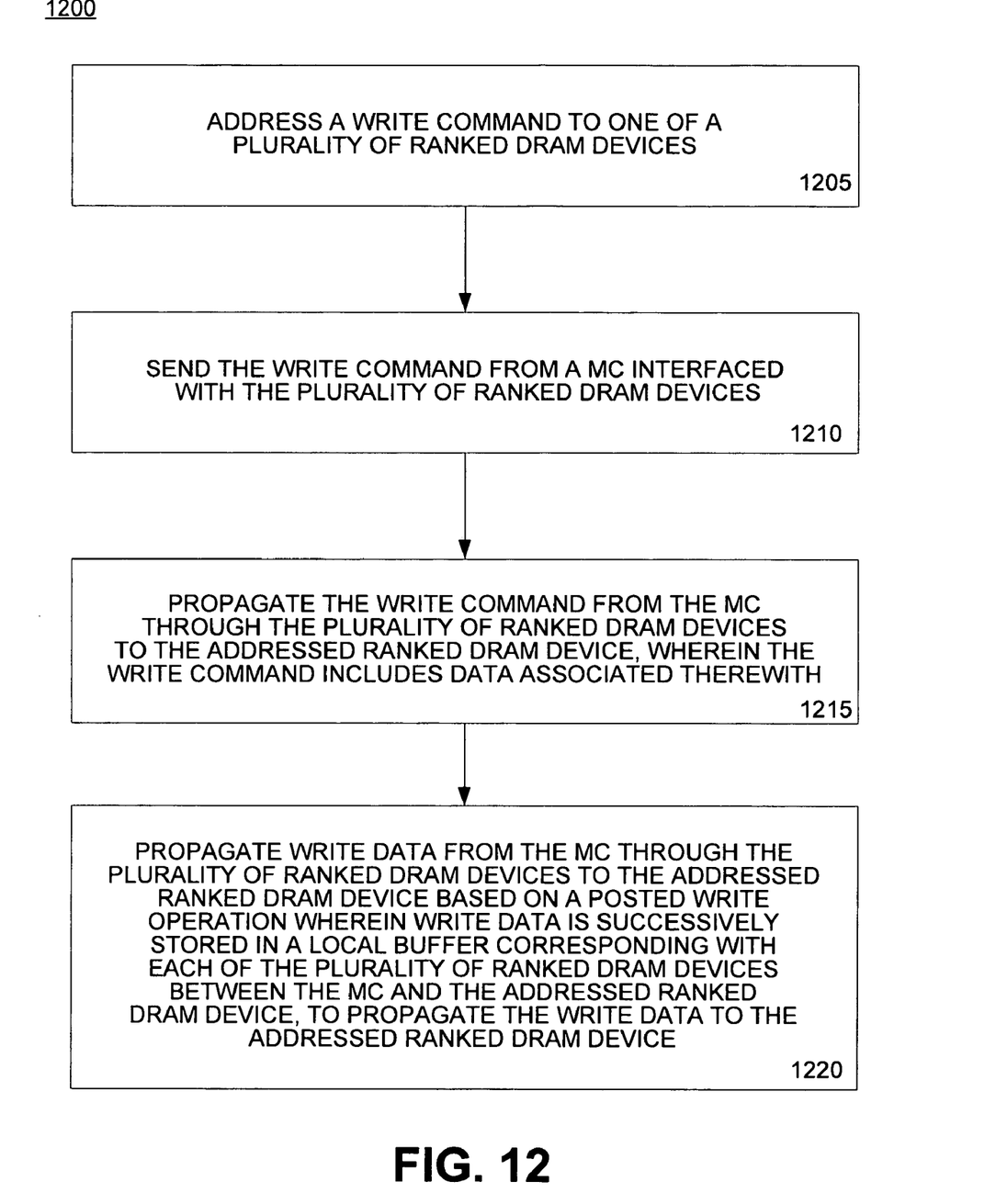
FIG. 12 is an exemplary flow diagram, in accordance with some embodiments herein.

FIG. 12 is an exemplary flow diagram for some embodiments of a method herein. Process 12 may be better understood by referring to timing diagrams 1305, 1310, 1315, and 1320, generally 1300, in FIG. 13. Process 12 is directed to a posted write process. The allocation of an entire communication link may be difficult to implement given the many requests made in a computer system. Posted write process 1200 addresses this difficulty by attempting to divide a WRITE operation into portions that may manage the links between the MC and the plurality of ranked DRAM devices efficiently.

Posted write process 1200 may use command bits in the implementation thereof, in addition to the WRITE command and data bits. The additional command bits may represent an ENABLE WRITE BUFFER command for a local buffer storage device associated with each of the plurality of ranked DRAM devices. The ENABLE WRITE BUFFER command bits provide a mechanism for the MC to manage the DRAM buffer, the local storage held inside of each ranked DRAM device. An asserted ENABLE WRITE BUFFER command allows a link to be driven by a rank(N) DRAM device to a rank(N+1) DRAM device. An asserted ENABLE WRITE BUFFER command, as controlled by the MC, may allocate, for example, a rank 2 DRAM device (e.g., DRAM device 220) to drive data to a rank 3 DRAM device (e.g., DRAM device 225) in the process of propagating write data to the addressed DRAM device. For the 4 rank system illustrated herein, 4 ENABLE WRITE BUFFER bits may be used. Data is written to rank 0 in a manner similar to that of process 900, however the data may be written to a buffer if not addressed to rank 0 or written to the DRAM device if it is addressed to rank 0.

At operation 1205, the MC initiates a WRITE command to one of a number of ranked DRAM devices interfaced with the MC. The MC controls all timing and initiation of operations between the MC and the plurality of ranked DRAM devices and between the plurality of ranked DRAM devices. The initiated WRITE command includes an address of one of the ranked DRAM devices to which data is to be written.

At operation 1210, the WRITE command is sent from the MC to the plurality of ranked DRAM devices interfaced with the MC. The WRITE command is propagated from the MC through the plurality of ranked DRAM devices to the DRAM device addressed by the WRITE command at operation 1215.

At operation 1220, WRITE data for the addressed ranked DRAM device is propagated through the plurality of ranked DRAM devices from the MC to the addressed DRAM device. When the WRITE command is issued to, for example, rank 2, the MC allocates only the data path between the MC and rank 0 for the WRITE command. The received write data at rank 0 is stored in a local buffer associated with the rank 0 DRAM device until an ENABLE WRITE BUFFER command is asserted for rank 0. When the rank 0 DRAM device's corresponding ENABLE WRITE BUFFER is asserted by the MC, the write data in the local buffer of the rank 0 DRAM device is driven to rank(N+1=0+1=1), and so on until the addressed rank is reached. Accordingly, storage for the posted write process includes memory for all rank and address information that is passed along with the ENABLE WRITE BUFFER bit.

Figure 10:
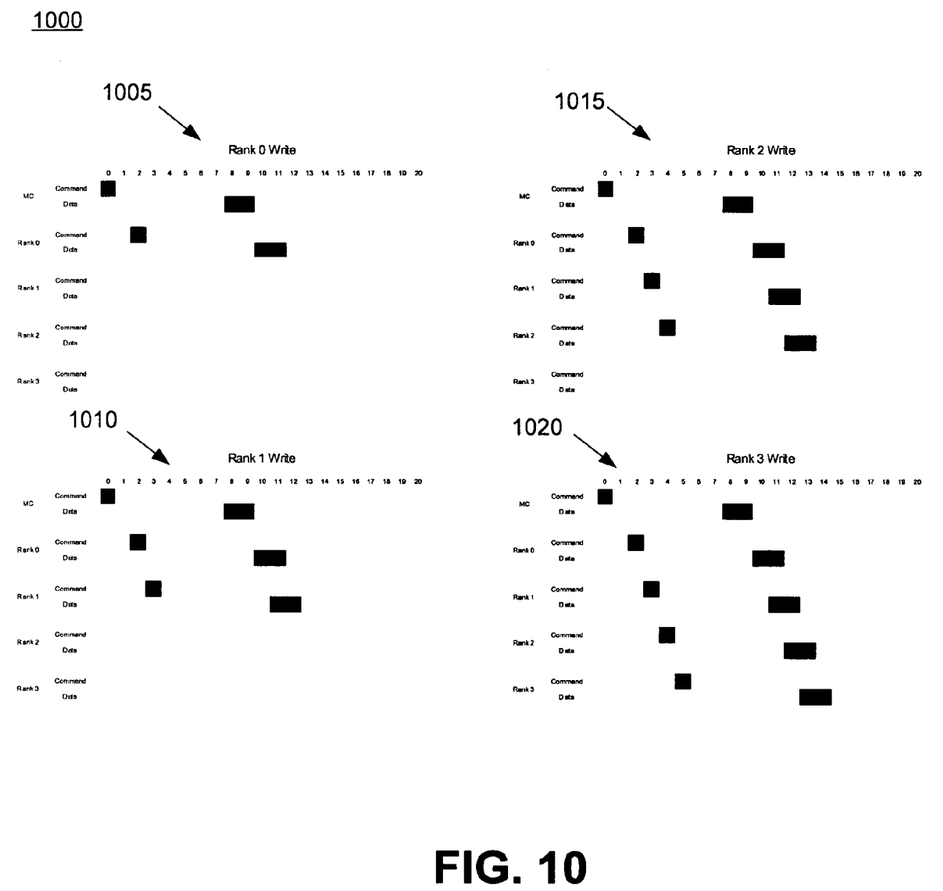
FIG. 10 is an exemplary timing diagram, in accordance with some embodiments herein.
Figure 13:
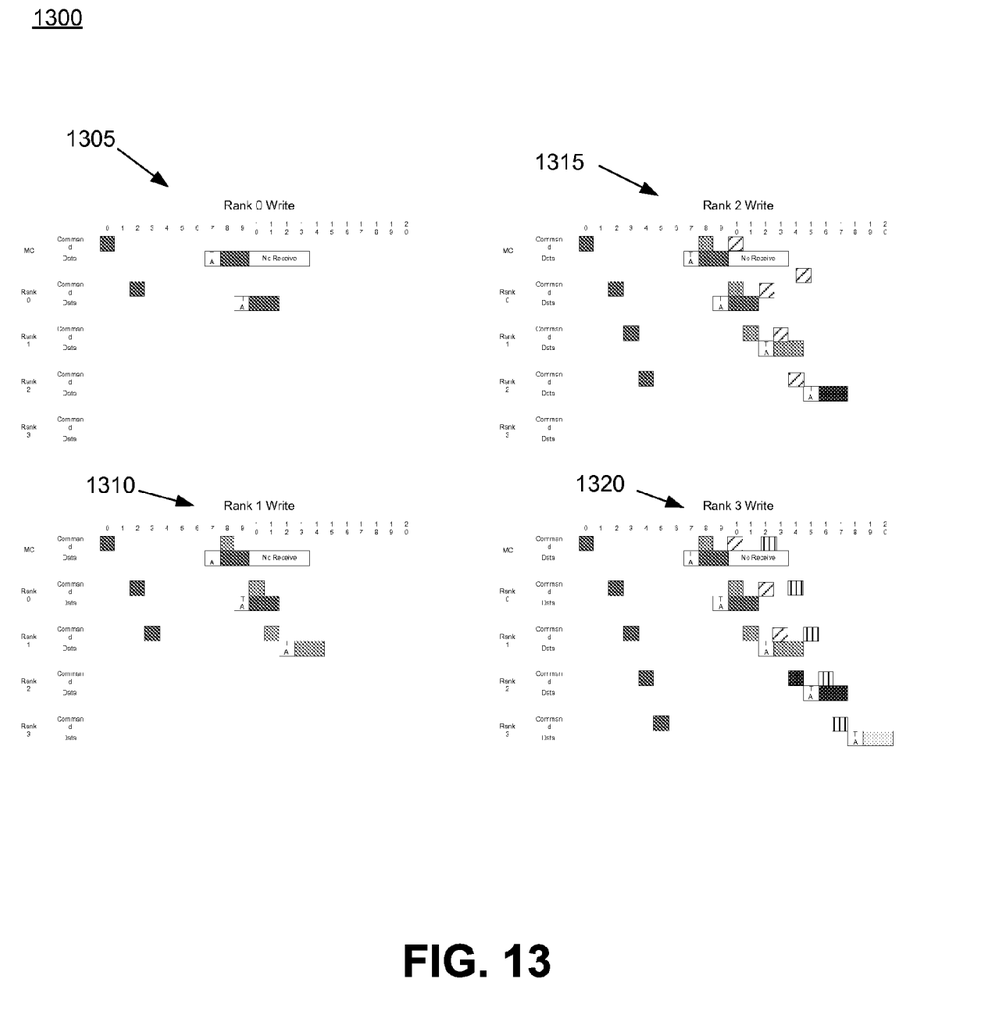
FIG. 13 is an exemplary schematic diagram, in accordance with some embodiments herein.

As depicted in FIG. 1300, the write limitations associated with the posted write operation are less complex than those associated with the pass-through write process of FIG. 10. It is noted that process 1300 does include the costs of additional information, the ENABLE WRITE BUFFER bits, to move the requested read data from buffer to buffer of corresponding ranked DRAM devices until the addressed DRAM device is reached.

In some embodiments, multiple outstanding WRITE operations may be supported using multiple storage elements for each DRAM device. The multiple outstanding WRITES may be handled in a FIFO manner. For example, when a rank receives an ENABLE WRITE BUFFER assertion, it moves its associated first data buffer on the data signals and shifts the remainder of data up. In an instance a rank does not have any stored data, an ENABLE WRITE BUFFER assertion invokes a bypass operation.

Figure 14:
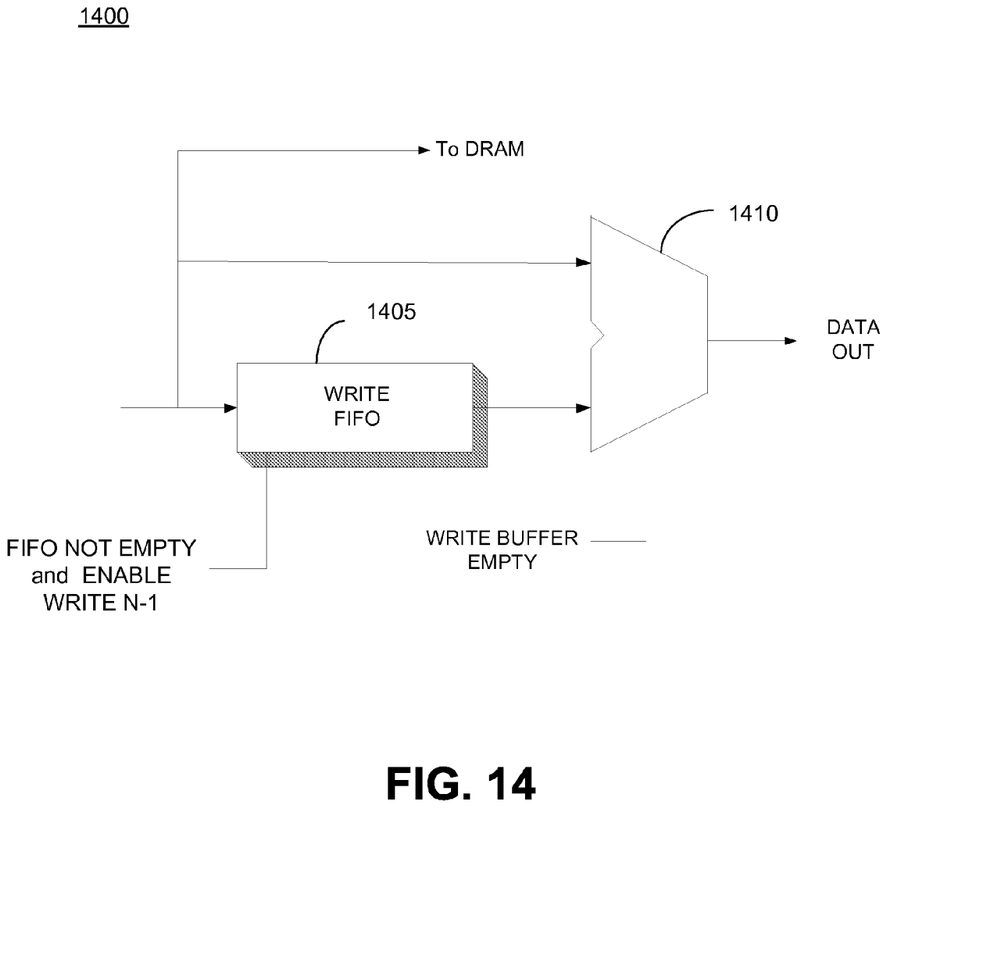
FIG. 14 is a schematic diagram; in accordance with some embodiments herein.

FIG. 14 is an exemplary schematic diagram of a circuit that may be used to implement some embodiments of a DRAM device including local buffers, in accordance with some embodiments herein. Circuit 1400 includes a WRITE FIFO buffer 1405 and a data multiplexer 1410. Circuit 800 includes a bypass option that bypasses referencing the WRITE FIFO. The bypass option is depicted by the multiplexer 1410 input labeled "WRITE BUFFER EMPTY". In an instance the WRITE BUFFER EMPTY signal is received by multiplexer 1410, the DATA OUT is the write data provided to the DRAM from a proceeding DRAM device or the MC.

The foregoing disclosure has been described with reference to specific exemplary embodiments thereof. It will, however, be evident that various modifications and changes may be made thereto without departing from the broader spirit and scope set forth in the appended claims.

I claim:

1. A method comprising:
    addressing a READ command to a rank (n) dynamic random access memory (DRAM) device of a plurality of ranked DRAM devices, each of the plurality of DRAM devices having an associated local buffer storage device;
    sending the READ command from a memory controller (MC) interfaced with the plurality of ranked DRAM devices to the rank (n) DRAM device;
    allocating a communication path only from the rank (n) DRAM device and a rank (n−1) DRAM device;
    propagating data associated with the READ command from the rank (n) DRAM devices to the rank (n−1) DRAM device over the allocated communication path;
    storing the data associated with the READ command in the local buffer storage device associated with the rank (n−1) DRAM device until an ENABLE READ command is asserted for the rank (n−1) DRAM device by the MC; and
    propagating the data associated with the READ command from the rank (n−1) DRAM device to the MC in a predetermined order based on a rank assigned to the plurality of ranked DRAM devices and an ENABLE READ command from the MC that provides a mechanism to move the data associated with the READ command from the local buffer storage device of the plurality of ranked DRAMS to the MC.

2. The method of claim 1, wherein the READ command comprises a command and data associated therewith.

3. The method of claim 1, wherein propagating the data associated with the READ command from the rank (n−1) DRAM device to the MC further comprises;
    propagating the data associated with the READ command from the rank (n) DRAM device through the plurality of ranked DRAM devices to the MC based on a deferred read operation wherein the data associated with the READ command is successively stored in a local buffer associated with each of the plurality of ranked DRAM devices between the rank (n) DRAM device and the MC, to propagate the read data to the MC.

4. The method of claim 1, wherein communication links connected to the MC and connected to the plurality of ranked DRAM devices are bidirectional links that may be driven by the MC and the plurality of ranked DRAM devices, one at a time.

5. The method of claim 1, wherein the READ command and communication timing operations between the MC and the DRAM devices and communication between the plurality of DRAM devices are controlled by the MC.

6. The method of claim 1, wherein the READ command includes at least an address rank associated with one of the ranked DRAM device and a column address for the addressed ranked DRAM device.

7. A method comprising:
addressing a WRITE command to a ranked dynamic random access memory (DRAM) device of a plurality of ranked DRAM devices, each of the plurality of DRAM devices having an associated local buffer storage device;
sending the WRITE command from a memory controller (MC) interfaced with the plurality of ranked DRAM devices to the addressed ranked DRAM device;
allocating a communication path only from the MC and a rank (N) DRAM device;
propagating data associated with the WRITE command from the MC to the rank (N) DRAM device over the allocated communication path;
storing the data associated with the WRITE command in the local buffer storage device associated with the rank (N) DRAM device until an ENABLE WRITE command is asserted for the rank (N) DRAM device by the MC; and
propagating the data associated with the WRITE command from the rank (N) DRAM device to the rank (N+1) DRAM device until the addressed ranked DRAM device is reached in a predetermined order based on a rank assigned to the plurality of ranked DRAM devices and an ENABLE WRITE command from the MC that provides a mechanism to move the data associated with the WRITE command from the MC to the local buffer storage device of the plurality of ranked DRAMS.

8. The method of claim 7, wherein the propagating the data associated with the WRITE command from the rank (N) DRAM device to the rank (N+1) DRAM device further comprises:
propagating write data from the MC through the plurality of ranked DRAM devices to the addressed ranked DRAM device based on a posted write operation wherein WRITE data is successively stored in a local buffer associated with each of the plurality of ranked DRAM devices between the MC and the addressed ranked DRAM device, to propagate the write data to the addressed ranked DRAM device.

9. The method of claim 7, wherein communication links connected to the MC and connected to the plurality of ranked DRAM devices are bidirectional links that may be driven by the MC and the plurality of ranked DRAM devices, one at a time.

10. The method of claim 7, wherein the WRITE command and communication timing operations between the MC and the DRAM devices and communication between the plurality of DRAM devices are controlled by the MC.

11. The method of claim 7, wherein the WRITE command includes at least an address rank associated with one of the ranked DRAM device and a column address for the addressed ranked DRAM device.

12. The method of claim 7, wherein (N=0).

* * * * *